Dec. 29, 1953
L. J. SCULLY
2,663,948
DEVICE FOR MEASURING PITCH DIAMETER OF SCREWS, BOLTS, AND THE LIKE
Filed Dec. 2, 1952
2 Sheets-Sheet 1
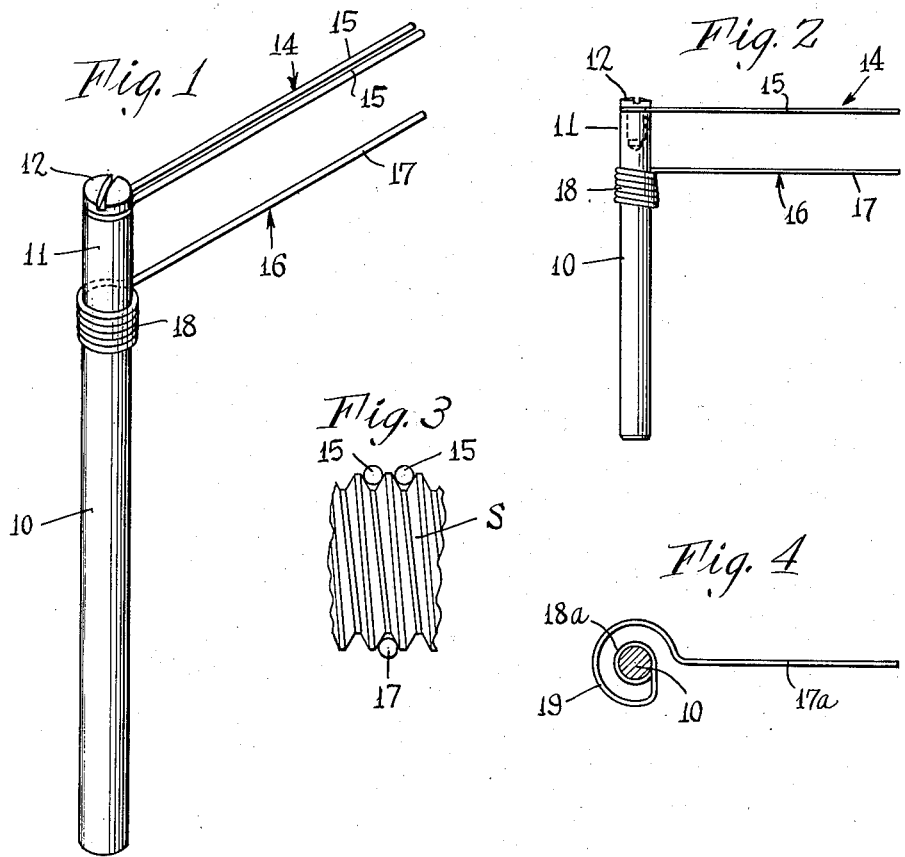
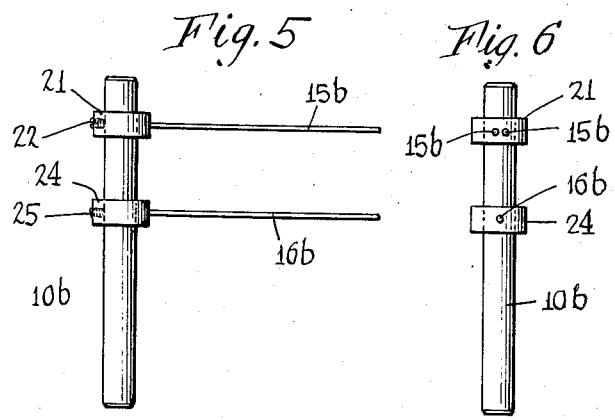
Inventor
Lawrence J. Scully
By Johnson and Kline
Attorneys

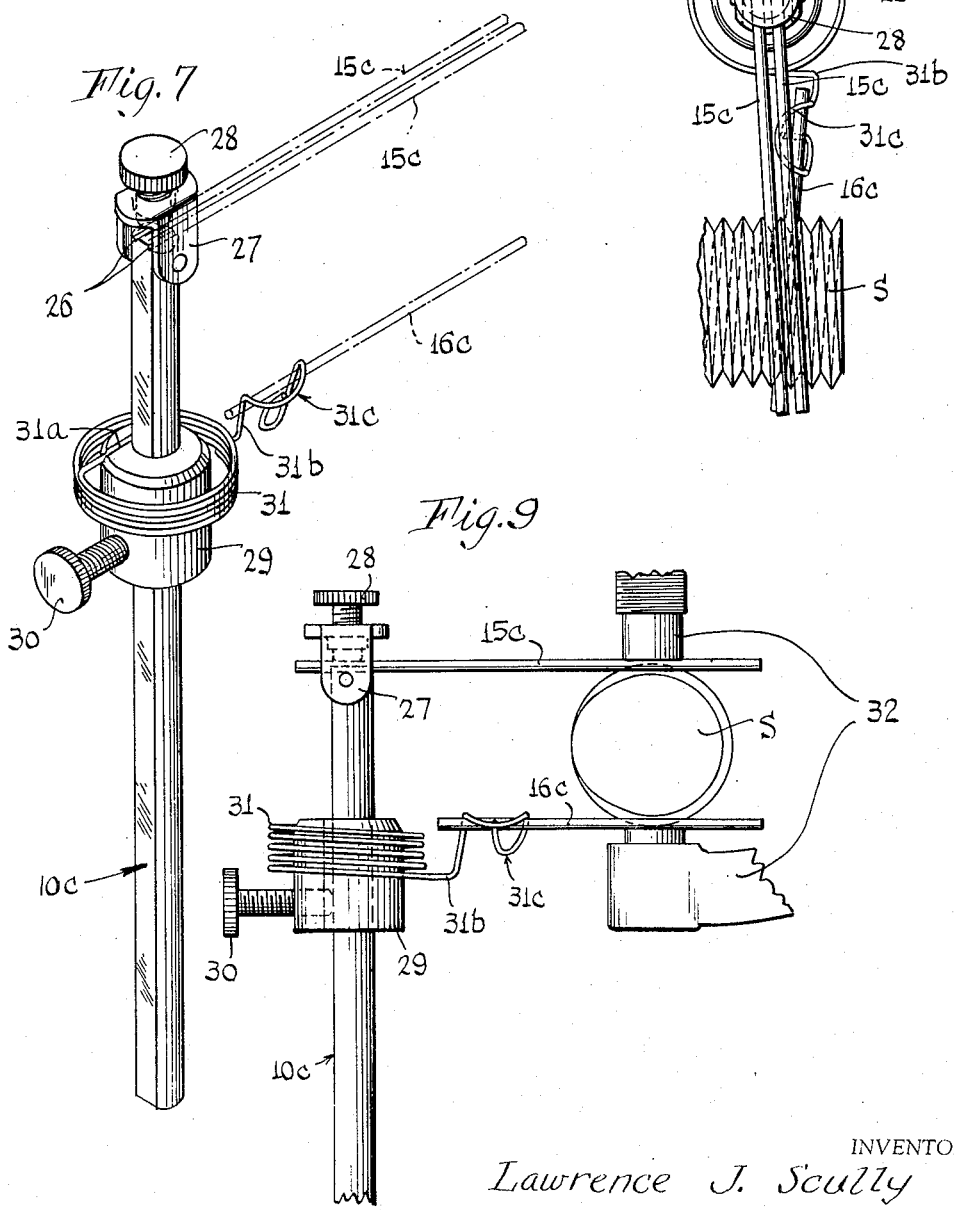

Patented Dec. 29, 1953

2,663,948

UNITED STATES PATENT OFFICE 2,663,948

DEVICE FOR MEASURING PITCH DIAMETER OF SCREWS, BOLTS, AND THE LIKE

Lawrence J. Scully, Bridgeport, Conn.

Application December 2, 1952, Serial No. 323,637

9 Claims. (Cl. 33—199)

This invention is concerned with improvements in gauges for measuring threads and is more particularly concerned with gauges to be used in the determining of the pitch diameter of externally threaded elements such as screws, bolts, and the like.

This application is a continuation-in-part of my application Serial No. 211,249, filed February 16, 1951 now abandoned.

The pitch diameter of a straight screw member is the diameter of an imaginary cylinder, the surface of which would pass through the threads at such points as to make the width or thickness of the thread equal to the width of the space between the threads, as cut by the surface of the cylinder.

The present invention may be considered as being based upon what is well known in machine shops as the three wire method of screw thread measurement which is used extensively in tool room work for measuring or checking the pitch diameters of screw members. In this method, two straight wires of circular cross section and of known uniform diameter are placed parallel to each other in contact with the inclined sides of adjacent screw threads and a third similar wire is placed parallel to the first two wires in the screw thread substantially diametrically opposite to the screw threads contacting the first two wires. Wires of any diameter may be used provided the wires are small enough to make contact with the inclined sides of the screw threads, and large enough to project above the top or crest of the threads so that a micrometer or other measuring instrument may come into contact with the outside edges of the wires. The pitch diameter may then be calculated from this "wire measurement," when the pitch and major diameter of the screw member are known, or can be determined.

It is apparent that this method of measurement of pitch diameter of externally threaded members requires considerable dexterity and skill and the manipulation of many things at one time in order to get precise measurements. The screw or like member may be held in a chuck or vise and thus reduce the number of elements to be held by one. However, the three wires must be held in strict parallel relationship and positioned in the appropriate screw threads with the proper amount of contact pressure and the micrometer must then be used to measure the distance over the outsides of the wires. If this is done by one workman, the difficulty is immediately apparent inasmuch as the three wires must be very carefully held in proper parallel condition in one hand so as to permit the other hand to be free to properly use a micrometer or other measuring device for an accurate reading. This is not too easily done and the possibility of errors and inaccuracies is considerable. For example, in measuring screw threads or screw thread gauges by the three wire method, variations in contact pressure alone will result in different readings. The result of a variation in contact pressure in the measurement of threads of fine pitches is shown by the difference in the readings obtained with pressures of two pounds as compared to five pounds, in checking a thread plug gauge having 24 threads per inch. The reading over the wires with five pounds pressure was 0.00013 inch less than with two pounds pressure. Greater contact pressure would cause greater differences.

It is a purpose of the present invention to provide a simple device capable of easily and accurately holding the three wires with the proper contact pressure required for measuring the pitch diameter.

It is a further purpose of the present invention to provide a simple device for holding the three wires in proper parallel relationship at all times and spacing the wires the proper distance apart to fit the appropriate threads on the screw member during the determination of the pitch diameter thereof.

It is a still further purpose of the present invention to provide an adjustable device for determining the pitch diameter of externally threaded elements of different diameters.

A feature of the present invention is the provision of a simple device which can be easily handled and used by one man to determine accurately the pitch diameter of screw threads.

Other purposes and features of the present invention will become apparent in the following description, referring to the drawings in which:

Figure 1 is a perspective showing of a pitch diameter measuring device of the present invention.

Fig. 2 is a view in elevation of the device shown in Fig. 1.

Fig. 3 is a fragmentary view showing the positioning of the three wires in their respective screw threads.

Fig. 4 is a cross-sectional view taken at right angles through the handle of the device below the top pair of wires to show a modified form of the lower wire.

Fig. 5 is a view in elevation of a modified form of measuring device.

Fig. 6 is a view in end elevation of the modified device of Fig. 5.

Fig. 7 is a perspective of another form of wire holding device with the wires shown in dot and dash.

Fig. 8 is a top view of the device of Fig. 7.

Fig. 9 is a side view of the device of Fig. 7.

Referring to the drawings, the preferred form of the pitch diameter measuring device of the present invention comprises a cylindrically shaped barrel or handle 10 made of any rigid material such as aluminum, stainless steel, etc., and having a bored upper end portion 11 which is internally threaded or tapped so as to be capable of receiving a fastening means such as a locking screw 12. As shown, the barrel or handle 10 is cylindrical but it could have other cross sections such as hexagonal, octagonal, square, etc. A pair of wires are mounted at the end of the handle to engage the threads. In the form of the invention illustrated in Figs. 1 and 2 these are produced by a steel wire 14 bent in the form of a hairpin and having two straight substantially parallel legs 15, 15. The wire 14 is adapted to be positioned around the shank of the locking screw 12 and to be held against movement relative to the barrel by the tightening of the screw, as shown in Figs. 1 and 2.

The wire 14 should be made of a high grade steel which is resistant to rusting and other corrosive action and should have glass-hard working surfaces which should be lapped to a uniform diameter. The straight legs 15, 15 forming the thread contacting wires are most critical and should be round in cross section within very low tolerances to form true right cylindrical members.

A third steel wire 16 similar in quality and characteristics to wire 14, is provided and has one end 18 helically coiled around the barrel 10 to maintain the other end 17 extending substantially perpendicularly from the barrel 10 in substantially parallel relationship to the pair of wire legs 15, 15. The helical coils 18 of the wire 16 are so wrapped around the barrel 10 as to grip it frictionally to prevent accidental slippage or movement thereof relative to the barrel 10. The coils 18, however, do not grip the barrel so tightly as to prevent the person using the device from moving the wire 16 around or along the barrel 10, as desired or necessary, in the operation of the measuring device.

Consideration of Fig. 3 will reveal how the three wires are positioned with respect to the threads of the screw member S, the pitch diameter of which is to be determined. This position may be achieved very simply by sliding the helical coils 18 down the barrel so as to permit the entry of the screw member S between the wires 15, 15 and 16 with the wire legs 15, 15 contacting and resting within adjacent threads, as shown. The screw member S should be placed close to the barrel 10 and the helical coil 18 should then be gently urged upwardly with the proper pressure so that the wire 17 will contact and lie within the screw thread which is substantially diametrically opposite the screw threads which receive the pair of parallel wire legs 15, 15. Such a movement may be easily accomplished and the proper contact pressure may be obtained without difficulty.

The device may then be held in one hand by the barrel 10, in which case the frictional engagement of the coils 18 will maintain the wire 16 against the screw S to hold it in proper position and the overall measurement outside the wires may then be taken by micrometers or other measuring instruments held in the other hand.

By determining the number of threads per inch and the major diameter of the screw member S, its pitch diameter may be very easily calculated in the usual manner by the "wire measurement" formula which, for example, in the case of the American Standard thread is:

$$M = D - 1.5155P + 3W$$

wherein:
M is the overall wire measurement
D is the major diameter of the screw thread
P is the pitch of the screw thread
W is the wire diameter.

Charts may, of course, be furnished whereby the pitch diameter may be obtained by a direct reading thereon as determined by the measurements taken. Separate charts could be provided for the different types of screw threads such as the American Standard, the V-thread, the Acme thread, the Buttress thread, etc.

Inasmuch as the particular cross-sectional shape of any one type of thread is independent of the major diameter of the screw and dependent solely upon the number of threads per inch, it is readily apparent that one pair of wires would be suitable for all diameter screws having the same number of threads per inch. Adjustment to various diameters for different size screws having the same number of threads per inch is provided for by the adjustability of the slidable coil 18 upon the barrel 10 whereby all screw members up to a diameter substantially equal to the length of barrel 10 may be measured.

It is to be appreciated that the length of the wires and of the barrel selected for the drawings is merely illustrative of the invention and is not to be construed as limitative thereof. The lengths of the wires and of the barrel may be increased as desired or necessary to fit the needs of the particular situation.

In order to provide for the measuring and checking of screw members having different numbers of threads per inch, correspondingly different pairs of wires should be employed and thus a complete set of wires should be available so that all the different standard pitches of screw threads could be measured. Inasmuch as any wire diameter may be used provided the wires are small enough to contact the inclined sides of the screw threads, and large enough to project above the tops of the screw threads, it is possible that any one set of wires may be used with several screw members having slightly different numbers of threads per inch. In this way, a fewer number of sets of wires would be required for a complete set. However, for each pitch screw thread, there is a "best size" or most accurate wire.

The "best size" wire would be one which contacts the sides of the screw threads at the pitch line, or the mid-slope of the thread. At such a line, the thickness of the thread equals the width of the space between the threads and the determination of the pitch diameter is least affected by any possible variation or error in the included thread angle. The "best size" wire may be obtained by a simple formula in which:

$$W = 0.5P \text{ Secant } A_t$$

wherein:
W = the diameter of the best size wire
P = the pitch of the screw thread
$A_t$ = one-half of the included thread angle.

For example, in the case of a sixty degree thread, this "best size" wire would be 0.57735P.

In addition to the change of wire size, the spacing between the top pair of parallel wires 15, 15 also would have to be changed so that the wires would be substantially parallel to each other and rest in the adjacent screw threads at the same time. The spacing between the wires should be substantially equal to the thread pitch.

In many cases, it is desired that the lower wire 16 be so constructed that it is rather flexible so it may follow more closely the slight lead angle of the screw threads. Such a construction is shown in Fig. 4, wherein the top coil 19 of the helical coils 18a is made of a larger diameter so as to be clear of the barrel 10, thus affording the desired extra degree of flexibility or spring to the end 17a of the wire.

Where many screw threads of the same number of threads per inch and major diameter are to be measured, it is more convenient to have the wires more or less secured to the barrel, rather than frictionally engaged therewith, to reduce the possibility of accidental slippage. Such a construction is shown in Figs. 5 and 6, wherein a cylindrical block or collar 21 is provided and is adapted to be secured to the barrel 10b by means of a set screw 22. The top pair of parallel wires 15, 15b may be secured to the collar by being inserted into bored holes therein or by any other securing means so as to extend substantially perpendicularly from the barrel 10b. Another cylindrical block or collar 24 is provided and is adapted to be secured to the barrel 10b by means of a set screw 25 whereby a lower wire 16b may be mounted to extend perpendicularly from barrel 10b and to be maintained parallel to the top wires 15b, 15b. This provides for a more rugged construction but, of course, one which would require more time for adjustment. It is not necessary that both collars 21, 24 be adjustable. It is merely necessary that they be relatively movable and for that purpose one collar could be fixed to the barrel 10b by a set screw and the other could be frictionally slidable without a set screw. The flexible features noted in Fig. 4 could also be incorporated in this modification.

The following is an example of a chart which could be used with the device of the present invention.

| Pitch | Wire size, inches | Subtraction constant |
|---|---|---|
| 18 | 0.032 | 0.0494 |
| 16 | 0.037 | 0.0582 |

The chart is used as follows: the pitch of the screw or bolt is normally known, or may be determined by a visual inspection. The appropriate wire size is selected and a micrometer is used with the proper contact pressure to determine the overall wire measurement. The subtraction constant is the amount which is to be subtracted from this overall wire measurement to yield the pitch diameter. For example, the overall wire measurement of an 18 pitch screw was 0.2919". The pitch diameter is arrived at by subtracting 0.0494" from 0.2919" to yield a pitch diameter of 0.2425".

In cases where the three wires are available, it is merely necessary to supply a holder for the wires in order to produce the measuring device of the present invention. Such a holder is shown in Figs. 7 to 9. In this construction a handle 10c is provided at its upper ends with means to hold a pair of wires in predetermined parallel relation. While this means may take many forms, in the herein illustrated form of the invention it comprises a pair of grooves 26 extending across the top of the handle and a pivoted U-shaped bracket 27 extending over the end of the handle and having a clamping screw 28 therein for clamping the wires in the grooves to project perpendicularly from the handle in predetermined parallel relation. Slidably mounted on the handle is a mounting means for the third wire 16c. This comprises a collar 29 slidable on the handle and having a screw 30 to clamp it in adjusted position. Carried by the collar is an enlarged helical coil 31 which, as shown in the drawings, has a diameter substantially larger than the handle and the mounting collar. One end of the coil is anchored to the collar at 31a and the other end 31b extends outwardly and is bent into a clip 31c, as shown in Fig. 7 to detachably hold the third wire. The helical coil is preferably made of a relatively light wire so that the third wire can be moved toward or away from the parallel wires and angularly with respect to the parallel wires to enable the third wire to assume the helix angle of the thread so as to lie in the thread during the measuring operation.

In operation the screw in the collar is released and the collar moved up until the wires engage the threads. The third wire 16c assumes the angular relation as shown in Fig. 8 with respect to the parallel wires 15c, 15c so that it lies in the thread being gauged. Calipers 32 are then brought into engagement with the wires as shown in Fig. 9 and the pressure of the calipers will cause the third wire to assume parallel relationship with the pair of wires, with the helical coil separating as shown in Fig. 9, if necessary, to accomplish this purpose.

Variations and modifications may be made within the scope of the claims and portions of the improvements may be used without others.

I claim:

1. A gauge for use in determining the pitch diameter of an externally threaded screw member comprising an elongate handle; a pair of parallel wires having cylindrical portions provided with diameters small enough to contact the inclined sides of adjacent screw threads of the externally threaded screw member but large enough to project beyond the tops of the screw threads thereof; means to fixedly mount said pair of wires on said handle adjacent one end thereof with the cylindrical wire portions extending perpendicularly therefrom; a third cylindrical wire having the same diameter as that of said pair of cylindrical wires; and mounting means for said third wire comprising means surrounding said handle and slidable therealong to adjustably position said third wire on said handle in predetermined spaced parallel relationship to said pair of parallel cylindrical wires, whereby said pair of parallel cylindrical wires and said third cylindrical wire may move relatively to contact the externally threaded screw member on substantially diametrically opposite sides thereof, so that a measurement may be taken of the overall distance over the cylindrical wire portions.

2. A gauge for use in determining the pitch diameter of an externally threaded screw member comprising a cylindrical handle; a pair of parallel wires having cylindrical portions provided with diameters small enough to contact the inclined sides of adjacent screw threads of the externally threaded screw member but large enough to project beyond the tops of the screw threads thereof; means to mount said wires on said handle with the cylindrical wire portions extending perpendicularly therefrom; a third wire including a cylindrical wire portion having the same diameter as that of said pair of cylindrical wire portions; and means comprising helical turns of said third wire to mount said cylindrical wire portion on said handle in spaced parallel relationship to said pair of parallel cylindrical wire portions for sliding movement relative thereto, whereby said pair of parallel cylindrical wires and said third cylindrical wire may move relatively to contact the externally threaded screw member on substantially diametrically opposite sides thereof, so that a measurement may be taken of the overall distance over the cylindrical wire portions.

3. The invention as defined in claim 2, wherein the top coil of said helical coil is of enlarged diameter as compared to the other coils of said helical coil, whereby the flexibility of said cylindrical wire portion is increased.

4. A gauge for use in determining the pitch diameter of an externally threaded screw member comprising a handle; a pair of parallel wires having cylindrical portions provided with diameters small enough to contact the inclined sides of adjacent screw threads of the externally threaded screw member but large enough to project beyond the tops of the screw threads thereof; means to mount said wires on said handle in fixed relationship thereon so as to be held against relative movement thereto with the cylindrical wires extending perpendicularly therefrom; a third wire including a cylindrical wire portion having the same diameter as that of said pair of cylindrical wires; and means comprising helical turns of said third wire to mount said cylindrical wire portion on said handle to be rotatable thereon in a plane parallel to that containing said pair of wires as well as movable toward or away from said pair of wires, whereby said pair of wires and said third wire may move relatively to contact the externally threaded screw member on substantially diametrically opposite sides thereof, so that a measurement may be taken of the overall distance over the wire portions.

5. The invention as defined in claim 4 wherein the top coil of said helical coil is of enlarged diameter as compared to the other coils of said helical coil, whereby the flexibility of said third cylindrical wire is increased.

6. A gauge for use in determining the pitch diameter of an externally threaded screw member comprising a cylindrical handle; a pair of parallel wires having cylindrical portions provided with diameters small enough to contact the inclined sides of adjacent screw threads of the externally threaded screw member but large enough to project beyond the tops of the screw threads thereof; means to fixedly clamp said wires at the end of said handle with the cylindrical wires extending perpendicularly therefrom; a third wire including a cylindrical portion having the same diameter as that of said pair of cylindrical wires; and means slidably mounting the third wire on the handle to position said cylindrical portion in spaced parallel relationship to said pair of parallel cylindrical wires to contact the externally threaded screw member on substantially diametrically opposite sides thereof, the third wire mounting means including a helical coil of larger diameter than the handle to enable the third wire to move angularly to assume a proper helix angle to lie in the thread so that a measurement may be taken of the overall distance over the cylindrical portions of the wires.

7. A gauge for use in determining the pitch diameter of an externally threaded screw member comprising a handle; a pair of parallel cylindrical wires having diameters small enough to contact the inclined sides of adjacent screw threads of the externally threaded screw member but large enough to project beyond the tops of the screw threads thereof; means to mount said parallel wires on said handle with the cylindrical wires extending perpendicularly therefrom; a third cylindrical wire having the same diameter as that of said pair of cylindrical wires; and means mounting said cylindrical wire on said handle in predetermined spaced relationship to said pair of parallel cylindrical wires to contact the externally threaded screw member on substantially diametrically opposite sides thereof, said mounting means including a helical wire coil surrounding said handle and being of enlarged diameter as compared to said handle, whereby said third wire may readily move toward or away from and angularly with respect to said parallel wires to assume a parallel relation with said pair of wires and a proper helix angle to lie in the thread to be measured during a gauging operation.

8. A device for use with three cylindrical wires having diameters small enough to contact the inclined sides of adjacent screw threads of the externally threaded screw member but large enough to project beyond the tops of the screw threads thereof in determining the pitch diameter of an externally threaded screw member comprising a handle; means at one end of the handle to mount a pair of said wires on said handle in parallel relation to extend perpendicularly therefrom; and means adjustable along said handle for supporting the third wire, said means including a helical wire coil surrounding said handle and being of an enlarged diameter as compared to said handle and having means detachably holding the third wire in predetermined spaced relationship to the pair of parallel cylindrical wires to contact the externally threaded screw member on substantially diametrically opposite sides thereof, said helical coil yielding and enabling the third wire to be readily moved toward or away and angularly with respect to the parallel wires to assume a parallel relation with said pair of wires and a proper helix angle to lie in the thread to be measured during a gauging operation.

9. A device for use with three cylindrical wires having diameters small enough to contact the inclined sides of adjacent screw threads of the externally threaded screw member but large enough to project beyond the tops of the screw threads thereof in determining the pitch diameter of an externally threaded screw member comprising a handle; means at one end of the handle to mount a pair of said wires on said handle in parallel relation to extend perpendicularly therefrom comprising parallel grooves in the end of the handle and clamping means securing the wires in said grooves; and means adjustable along said handle for supporting the third wire, said means including a helical wire coil surrounding said handle and being of an enlarged diameter as compared to said handle, the end of said coil having a reverse bend forming a clip for detachably holding the third wire in predetermined spaced relationship to the pair of parallel cylindrical wires to contact the externally threaded screw member on substantially diametrically opposite sides thereof, said helical coil yielding and enabling the third wire to be readily moved toward or away from and angularly with respect to the parallel wires to assume a parallel relation with said pair of wires and a proper helix angle to lie in the thread to be measured during a gauging operation.

LAWRENCE J. SCULLY.

References Cited in the file of this patent

UNITED STATES PATENTS

| Number | Name | Date |
|---|---|---|
| 2,554,024 | Govoni | May 22, 1951 |
| 2,622,337 | Ross | Dec. 23, 1952 |